United States Patent
Oshita et al.

(10) Patent No.: US 8,967,629 B2
(45) Date of Patent: Mar. 3, 2015

(54) SUSPENSION CONTROL APPARATUS FOR A VEHICLE

(75) Inventors: Morito Oshita, Kariya (JP); Fumio Kojima, Nagoya (JP); Katsuhiko Takasu, Nishio (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 38 days.

(21) Appl. No.: 13/805,199

(22) PCT Filed: Oct. 18, 2011

(86) PCT No.: PCT/JP2011/073894
§ 371 (c)(1),
(2), (4) Date: Dec. 18, 2012

(87) PCT Pub. No.: WO2012/063610
PCT Pub. Date: May 18, 2012

(65) Prior Publication Data
US 2013/0099456 A1  Apr. 25, 2013

(30) Foreign Application Priority Data
Nov. 11, 2010 (JP) ................................. 2010-253284

(51) Int. Cl.
*B60G 17/033* (2006.01)
*B60G 17/056* (2006.01)
(Continued)

(52) U.S. Cl.
CPC .......... *B60G 17/033* (2013.01); *B60G 17/0432* (2013.01); *B60G 17/056* (2013.01); *B60G 21/073* (2013.01); *B60G 2204/82* (2013.01); *B60G 2204/8304* (2013.01)
USPC .......... 280/5.508; 280/124.106; 280/124.157; 280/124.16; 280/124.161

(58) Field of Classification Search
USPC ............................ 280/5.508, 5.509, 124.106, 280/124.157–124.161; 251/281, 282, 318, 251/321; 137/493, 493.9
See application file for complete search history.

(56) References Cited

U.S. PATENT DOCUMENTS 2,716,995 A * 9/1955 Baugh et al. ................ 137/87.04
2,765,181 A * 10/1956 Butterfield ............... 137/614.03
(Continued)

FOREIGN PATENT DOCUMENTS

| JP | 62-143516 U | 9/1987 |
| JP | 2-136320 A | 5/1990 |
| JP | 4-46815 A | 2/1992 |

OTHER PUBLICATIONS

International Search Report (PCT/ISA/210) issued on Jan. 24, 2012, by the Japanese Patent Office as the International Searching Authority for International Application No. PCT/JP2011/073894.

*Primary Examiner* — Ruth Ilan
*Assistant Examiner* — Barry Gooden, Jr.
(74) *Attorney, Agent, or Firm* — Buchanan Ingersoll & Rooney PC

(57) ABSTRACT

A first communication passage is coupled to a left wheel cylinder pressure chamber at an upper vehicle side and a right wheel cylinder pressure chamber at a lower vehicle side to be communicated with each other, and a second communication passage is coupled to a left wheel cylinder pressure chamber at the lower vehicle side and a right wheel cylinder pressure chamber at the upper vehicle side to be communicated with each other. Between the first and second communication passages is a valve mechanism so that the first and second communication passages are normally communicated with each other, and fluid flow from one of the first communication passage and the second communication passage to the other is blocked, when a pressure difference, caused when fluid moves from one of the first communication passage and the second communication passage to the other, becomes equal to or greater than a predetermined value.

4 Claims, 4 Drawing Sheets

(51) Int. Cl.
*B60G 17/04* (2006.01)
*B60G 21/073* (2006.01)

(56) References Cited

U.S. PATENT DOCUMENTS

| | | | | |
|---|---|---|---|---|
| 3,090,611 | A * | 5/1963 | Schultze | 267/186 |
| 3,736,000 | A * | 5/1973 | Capgras | 267/64.16 |
| 4,606,551 | A * | 8/1986 | Toti et al. | 280/124.161 |
| 4,924,909 | A * | 5/1990 | Wilcox | 137/614.05 |
| 4,966,390 | A * | 10/1990 | Lund et al. | 280/5.502 |
| 5,139,104 | A * | 8/1992 | Moscicki | 180/89.13 |
| 5,219,181 | A * | 6/1993 | Lund | 280/5.508 |
| 5,480,188 | A * | 1/1996 | Heyring | 280/124.104 |
| 5,915,701 | A * | 6/1999 | Heyring | 280/6.155 |
| 6,144,907 | A * | 11/2000 | Shibuya et al. | 701/37 |
| 6,341,761 | B1 * | 1/2002 | Brunner et al. | 251/318 |
| 6,517,094 | B1 * | 2/2003 | Kincaid et al. | 280/124.106 |
| 7,293,780 | B2 * | 11/2007 | Germain et al. | 280/5.506 |
| 8,123,235 | B2 * | 2/2012 | Monk et al. | 280/5.5 |
| 8,167,318 | B2 * | 5/2012 | Ryan et al. | 280/5.506 |
| 2004/0080124 | A1 * | 4/2004 | Munday | 280/5.508 |
| 2006/0237942 | A1 * | 10/2006 | Munday et al. | 280/124.157 |
| 2008/0129000 | A1 * | 6/2008 | Munday et al. | 280/5.502 |
| 2008/0272561 | A1 * | 11/2008 | Monk et al. | 280/5.507 |
| 2009/0140501 | A1 * | 6/2009 | Taylor et al. | 280/5.508 |
| 2011/0068552 | A1 * | 3/2011 | Ryan et al. | 280/124.106 |

* cited by examiner

SUSPENSION CONTROL APPARATUS FOR A VEHICLE

TECHNICAL FIELD

The present invention relates to a suspension control apparatus for controlling a rolling motion of a vehicle so as to be restrained appropriately.

BACKGROUND ART

For example, in the following Patent document 1, it is aimed "to prevent surely a cross rolling to improve a maneuvering stability furthermore, and exclude a different feeling given to vehicle passengers", and there is proposed "a roll damping force control apparatus for a vehicle with damping force generating mechanisms for generating a damping force proportional to a roll velocity of the vehicle body, and capable of varying the roll velocity, provided between front and rear wheels and a vehicle body separately, wherein front and rear roll damping force control means is provided for controlling the damping force generating mechanisms respectively, so as to increase a ratio of the damping force of the front wheel to that of the rear wheel, as the value detected by the steering angle velocity detecting means for detecting the steering angle velocity increases". And, a structural example is disclosed in FIG. 2, and it is explained at the left below section of page 3 of its publication that "with respect to each of front wheels and rear wheels, an upper cylinder chamber U of a left wheel oil pressure cylinder 20FL (20RL) is coupled to a lower cylinder chamber L of a right wheel oil pressure cylinder 20FR (20RR) through one oil pressure piping 26A, and the lower cylinder chamber L of the left wheel oil pressure cylinder 20FL (20RL) is coupled to the upper cylinder chamber U of the right wheel oil pressure cylinder 20FR (20RR) through the other oil pressure piping 26B, whereby the cylinders are coupled crossly to each other", and it is explained at the right below section of the same page that "a control section 14B comprises a roll damping controller 36 which controls damping coefficients Ct, Cr for variable throttle valves 22F, 22R, and a steering angle sensor 38 and a vehicle speed sensor 40 which send detected signals to the controller 36".

PRIOR ART DOCUMENT

Patent Document

Patent Document 1:
Japanese Patent Laid-open Publication No. Hei4-46815.

SUMMARY OF THE INVENTION

Problems to be Solved by the Invention

However, according to the roll damping force control apparatus as described in the above Patent document 1, electromagnetic valves and electronic control devices such as roll damping controller and etc. are required, so that the apparatus becomes an expensive one.

Therefore, according to the present invention, it is an object to provide a suspension control apparatus capable of improving ride comfort and drivability on a rough road, and obtaining driving stability as well, by means of a simple structure, without the electromagnetic valves, electronic control devices and etc. being required.

Means for Solving the Problems

To solve the above-described problems, according to the present invention, there is provided with a left wheel cylinder having a first piston with an end portion thereof being supported on a wheel support portion at a left side of at least one axle out of a front axle and a rear axle of a vehicle, and a first housing supported on the vehicle body and divided by the first piston to define a pressure chamber at an upper side of the vehicle and a pressure chamber at a lower side of the vehicle, a right wheel cylinder having a second piston with an end portion thereof being supported on a wheel support portion at a right side of the one axle and a second housing supported on the vehicle body and divided by the second piston to define a pressure chamber at an upper side of the vehicle and a pressure chamber at a lower side of the vehicle, a first communication passage coupled to the pressure chamber of the left wheel cylinder at the upper side of the vehicle and the pressure chamber of the right wheel cylinder at the lower side of the vehicle to be communicated with each other, a second communication passage coupled to the pressure chamber of the left wheel cylinder at the lower side of the vehicle and the pressure chamber of the right wheel cylinder at the upper side of the vehicle to be communicated with each other, and a valve mechanism disposed between the first communication passage and the second communication passage, the valve mechanism normally communicating the first communication passage with the second communication passage, and blocking fluid flow from one of the first communication passage and the second communication passage to the other thereof, in the case where the fluid filled in the first communication passage, second communication passage, left wheel cylinder and right wheel cylinder causes a pressure difference to become equal to or greater than a predetermined value, when the fluid moves from one of the first communication passage and the second communication passage to the other thereof.

In the suspension control apparatus as described above, the valve mechanism comprises a housing for defining a first valve chamber and a second valve chamber, and defining a third valve chamber communicated with both of the first and second valve chambers, a first throttle valve member accommodated in the housing to open and close a communication passage between the third valve chamber and the first valve chamber, a second throttle valve member accommodated in the housing to open and close a communication passage between the third valve chamber and the second valve chamber, and a biasing portion which is accommodated in the housing, and which biases the first throttle valve member and the second throttle valve member so as to communicate the third valve chamber with the first valve chamber and the second valve chamber respectively, wherein the first communication passage is coupled to the first valve chamber to be communicated therewith, and the second communication passage is coupled to the second valve chamber to be communicated therewith, and wherein the first valve chamber, second valve chamber and third valve chamber are normally communicated with one another, and the fluid flow from one of the first valve chamber and the second valve chamber to the other thereof is blocked by one of the first throttle valve member and the second throttle valve member, in the case where a pressure difference, which is caused when the fluid moves from one of the first valve chamber and the second valve chamber to the other thereof, becomes equal to or greater than a predetermined biasing force of the biasing portion.

Especially, it may be so configured that the first throttle valve member and the second throttle valve member are accommodated in the first valve chamber and the second valve chamber respectively, and each of the first and second throttle valve members comprises a spherical valve body disposed to block the communication between the first and second valve chambers and the third valve chamber when seated on the respective valve seat provided in the housing, and a hollow member moving between two positions of one position for contacting the spherical valve body to force the spherical valve body be unseated from the valve seat and the other position for forcing the spherical valve body be seated on the valve seat, and the biasing portion comprises a spring for biasing each of the hollow members forming the first throttle valve member and the second throttle valve member so as to force the spherical valve body be unseated from the valve seat, wherein the spherical valve body is normally unseated from the valve seat so that the first valve chamber, second valve chamber and third valve chamber are communicated with one another through the hollow portions of the hollow members, and the spherical valve body is seated on the valve seat, in the case where the pressure difference, which is caused when the fluid moves from one of the first valve chamber and the second valve chamber to the other thereof through the third valve chamber, becomes equal to or greater than the predetermined biasing force of the spring.

In the suspension control apparatus as described above, it may further comprise accumulators communicated with the first communication passage and the second communication passage respectively, to apply roll stiffness to the fluid filled in the left wheel cylinder and the right wheel cylinder respectively.

Or, in the suspension control apparatus as described above, it may comprise a single accumulator communicated with the first communication passage and the second communication passage to apply roll stiffness to the fluid filled in at least one of the left wheel cylinder and the right wheel cylinder, and a changeover valve normally communicated with the accumulator, first communication passage and second communication passage, and changed over to communicate the accumulator with either one of the first communication passage and the second communication passage, when a pressure difference is caused between the pressure in the first communication passage and the pressure in the second communication passage.

Effects of the Invention

As the present invention has been configured as described above, the following effects are achieved. That is, according to the suspension control apparatus of the present invention, the valve mechanism is disposed between the first communication passage and the second communication passage, for normally communicating the first communication passage with the second communication passage, and blocking fluid flow from one of the first communication passage and the second communication passage to the other thereof, in the case where a pressure difference, which is caused when the fluid moves from one of the first valve chamber and the second valve chamber to the other thereof, becomes equal to or greater than a predetermined value, when the fluid moves from one of the first communication passage and the second communication passage to the other thereof, so that both of improving ride comfort and drivability on a rough road, and obtaining driving stability as well can be achieved by the valve mechanism of a simple structure, without using the electromagnetic valves, electronic control devices and etc. In the case where the vehicle is running straight on a flat road surface, for example, when the left and right wheels stroke in-phase, the first communication passage and the second communication passage are communicated with each other through the valve mechanism, so that the fluid can move freely, whereby a good ride comfort can be obtained. In the case where a rolling is caused by a turning motion of the vehicle, for example, when one of the left and right wheels strokes, so that such a state of the pressure difference caused by the fluid flow from one of the first valve chamber and the second valve chamber to the other thereof being equal to or greater than the predetermined value lasts equal to or more than a predetermined time period, the fluid flow is blocked by the valve mechanism, whereby the rolling can be surely restrained, and the driving stability can be obtained.

Provided that the valve mechanism is configured by comprising the first throttle valve and second throttle valve, the desired object can be achieved by means of only the valve mechanism with a mechanical simple structure. Especially, in the case where the speed of the fluid moved from one of the first communication passage and the second communication passage to the other thereof is changed instantaneously, such as the case where only one wheel rides on a step when the vehicle is running on a rough road, a delay is caused in follow-up operation of the first throttle valve and second throttle valve, so that the fluid flow is not blocked by the valve mechanism, whereby the ride comfort is not deteriorated. Furthermore, the first throttle valve and second throttle valve can be configured by the spherical valve member or the like accommodated in the housing as described before, so that an inexpensive apparatus can be provided.

Furthermore, provided that accumulators are disposed on the first communication passage and the second communication passage respectively, in the case where a rolling is caused by a turning motion of the vehicle, when one of the left and right wheels strokes, the roll stiffness is applied to the fluid filled in the left wheel cylinder and right wheel cylinder, whereby a gradual rolling can be processed appropriately.

Or, in addition to the valve mechanism as described before, provided that the changeover valve as described before is disposed, the desired object can be achieved by the single accumulator, so that a much more inexpensive apparatus can be provided.

EMBODIMENTS FOR CARRYING OUT THE INVENTION

Figure 1:
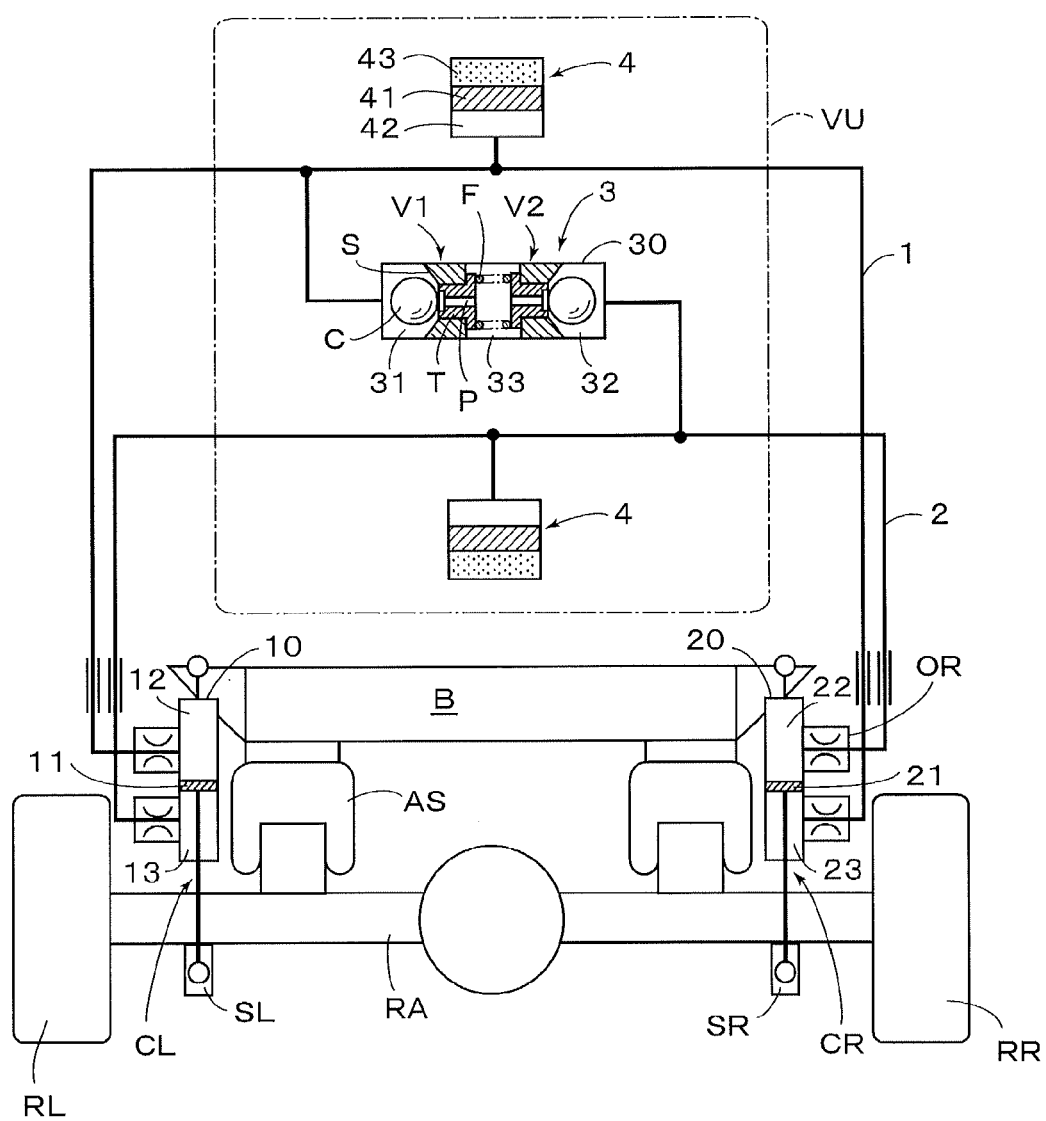
FIG. 1 is a front view showing schematically a structure at a rear axle of a suspension control apparatus according to an embodiment of the present invention.

Hereinafter, will be explained desirable embodiments of the present invention. At the outset, FIG. 1 shows a suspension control apparatus according to an embodiment of the present invention, wherein a left wheel cylinder CL and a right wheel cylinder CR are mounted on a rear axle RA of a vehicle, and they are coupled to a first communication passage 1 and a second communication passage 2 to be communicated with each other, and a fluid such as oil or the like is filled in them. The left wheel cylinder CL has a first piston 11 with an end portion thereof being supported on a wheel support portion SL at a rear left side of the vehicle, and a first housing 10 supported on a vehicle body B and divided by the first piston 11 to define a pressure chamber 12 at an upper side of the vehicle and a pressure chamber 13 at a lower side of the vehicle. Likewise, the right wheel cylinder CR has a second piston 21 with an end portion thereof being supported on a wheel support portion SR at a rear right side of the vehicle, and a second housing 20 supported on the vehicle body B and divided by the second piston 21 to define a pressure chamber 22 at the upper side of the vehicle and a pressure chamber 23 at the lower side of the vehicle.

And, the first communication passage 1 is coupled to the pressure chamber 12 of the left wheel cylinder CL at the upper side of the vehicle and the pressure chamber 23 of the right wheel cylinder CR at the lower side of the vehicle to be communicated with each other, and the second communication passage 2 is coupled to the pressure chamber 13 of the left wheel cylinder CL at the lower side of the vehicle and the pressure chamber 22 of the right wheel cylinder CR at the upper side of the vehicle to be communicated with each other, whereby a so-called cross-coupling is provided. Between the first communication passage 1 and the second communication passage 2, a valve mechanism 3 is disposed, and so configured that the first communication passage 1 is normally communicated with the second communication passage 2, and fluid flow is blocked from one of the first communication passage 1 and the second communication passage 2 to the other thereof, in the case where a pressure difference, which is caused when the fluid moves from one of the first communication passage 1 and the second communication passage 2 to the other thereof, becomes equal to or greater than a predetermined value (e.g., Pc).

With respect to the valve mechanism 3, a practical structure of which will be described later, as shown in FIG. 1, a first valve chamber 31 and a second valve chamber 32 are defined in a housing 30, and a third valve chamber 33, which is communicated with both chambers, is defined as well. Furthermore, in the housing 30, a first throttle valve member V1 which opens and closes a communication passage between the third valve chamber 33 and the first valve chamber 31, and a second throttle valve member V2 which opens and closes a communication passage between the third valve chamber 33 and the second valve chamber 32 are accommodated, and a spring F is accommodated as biasing portion, thereby to bias the first and second throttle valve members V1 and V2 in such a direction as to communicate the third valve chamber 33 with the first valve chamber 31 and the second valve chamber 32. According to the valve mechanism 3, therefore, the first valve chamber 31, second valve chamber 32 and third valve chamber 33 are normally communicated with one another, and the fluid flow from one of the first valve chamber 31 and the second valve chamber 32 to the other thereof is blocked by one of the first throttle valve member V1 and the second throttle valve member V2, in the case where the fluid causes a pressure difference, which is caused when the fluid moves from one of the first valve chamber 31 and the second valve chamber 32 to the other thereof through the third valve chamber 33, becomes equal to or greater than a predetermined biasing force (e.g., the predetermined value Pc as described above) of the spring F.

In the present embodiment, furthermore, the first communication passage 1 and the second communication passage 2 are coupled to accumulators 4 to be communicated therewith, respectively, and configured to apply roll stiffness to the fluid filled in the left wheel cylinder CL and the right wheel cylinder CR, respectively. In each accumulator 4, there are defined by a piston 41, which is accommodated in a housing 40 of a cylindrical shape, a regulating chamber 42 which is coupled to the first communication passage 1 or the second communication passage 2 to be communicated therewith, and a gas chamber 43 filled with a gas such as nitrogen or the like. In FIG. 1, the reference indicated by "OR" represents an orifice (throttle), which appears only at one portion in FIG. 1, the same orifices are provided for the pressure chambers 12, 13 of the left wheel cylinder CL and pressure chambers 22, 23 of the right wheel cylinder CR, respectively, thereby to reduce a fluid speed of the fluid fed into each pressure chamber through each orifice. Also, "AS" represents an air spring device. Furthermore, the valve mechanism 3 or accumulators 4 as indicated by a frame of one-dotted chain line in FIG. 1 may be configured integrally to provide a valve unit VU.

Accordingly, in the suspension control apparatus of the present embodiment, as in the case where the vehicle is running straight on a flat road surface, for example, when the left and right wheels RL and RR stroke in-phase, the first and second throttle valve members V1 and V2 of the valve mechanism 3 are placed in their open positions, so that the first valve chamber 31, second valve chamber 32 and third valve chamber 33 are communicated with one another. Therefore, the accumulators 4, left wheel cylinder CL and right wheel cylinder CR are communicated with one another through the first communication passage 1 and the second communication passage 2, so that the fluid can move freely, whereby a good ride comfort can be obtained.

For example, in the case where a rolling is caused by a turning motion of the vehicle, when one of the left and right wheels RL and RR strokes, the roll stiffness is applied by means of the accumulators 4, so that the rolling is restrained appropriately. Furthermore, in the case where a rapid rolling is caused, so that such a state of the pressure difference, which is caused when the fluid moves from one of the first communication passage 1 and the second communication passage 2 to the other thereof, being equal to or greater than the predetermined biasing force (predetermined value Pc) of the spring F lasts equal to or more than a predetermined time period, the fluid flow from the higher pressure one of the first communication passage 1 and the second communication passage 2 to the lower pressure one is blocked by the valve mechanism 3, whereby the rolling can be surely restrained. On the contrary, in the case where the speed of the fluid which moves from one of the first communication passage 1 and the second communication passage 2 to the other thereof is gradual, so that the pressure difference caused at that time is smaller than the predetermined biasing force (predetermined value Pc), the accumulators 4, left wheel cylinder CL and right wheel cylinder CR are maintained to be communicated with one another through the first communication passage 1 and the second communication passage 2, whereby a ride comfort can not be deteriorated. Also, in the case where the speed of the fluid moved from one of the first communication passage 1 and the second communication passage 2 to the other thereof is changed instantaneously, such as the case where only one wheel rides on a step when the vehicle is running on a rough road, a delay is caused in follow-up operation of the first throttle valve V1 and second throttle valve V2, so that the fluid flow is not blocked by the valve mechanism 3, whereby the ride comfort is not deteriorated.

The valve mechanism 3 as described above is configured as shown in FIG. 2, for example, wherein the first throttle valve V1 and the second throttle valve V2 are formed in the same structure. For example, in case of the first throttle valve V1, a spherical valve body C is accommodated in the first valve chamber 31, and disposed to block the communication between the first valve chambers 31 and the third valve chamber 33, when it is seated on its valve seat S formed in the housing 30. Also, a hollow member T is disposed to contact the spherical valve body C, and configured to move between two positions of one position to force the spherical valve body C be unseated from the valve seat S and the other position to force the spherical valve body C be seated on the valve seat S. At the end face of the hollow member T which contacts the spherical valve body C, there is formed a groove G which is communicated with an opening of the hollow portion P, whereby it is so configured that when the spherical valve body C is not seated on the valve seat S, the first valve chamber 31, second valve chamber 32 and third valve chamber 33 are communicated with one another, even in the case where the hollow member T contacts the spherical valve body C. And, the spring F served as the biasing portion is disposed to bias each of the hollow members T forming the first throttle valve member V1 and the second throttle valve member V2 in such a direction as to force the spherical valve body C be unseated from the valve seat S. In lieu of the hollow member T as described above, a rigid piston member may be used, with its outer diameter being set to be capable of providing an annular space against a communication passage within the housing in which the piston member is accommodated. However, it is easier to use the hollow member T, and set the opening area of the hollow portion P appropriately.

Figure 2:
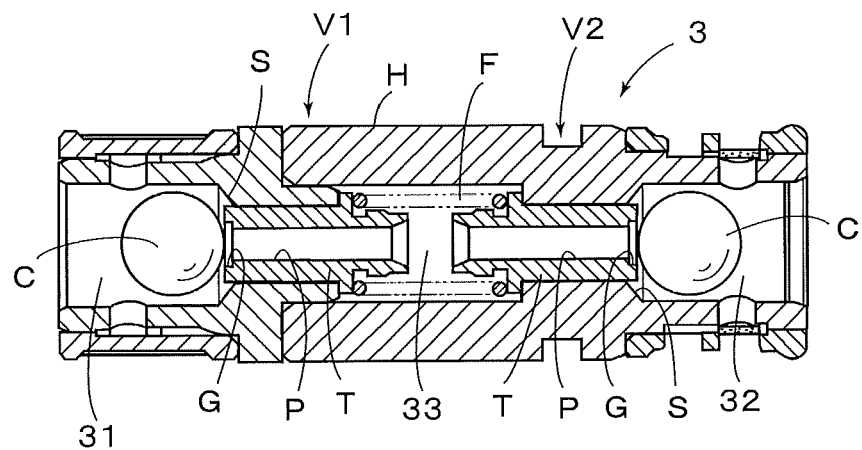
FIG. 2 is an enlarged sectional view of a valve mechanism for use in an embodiment of the present invention.
Figure 3:
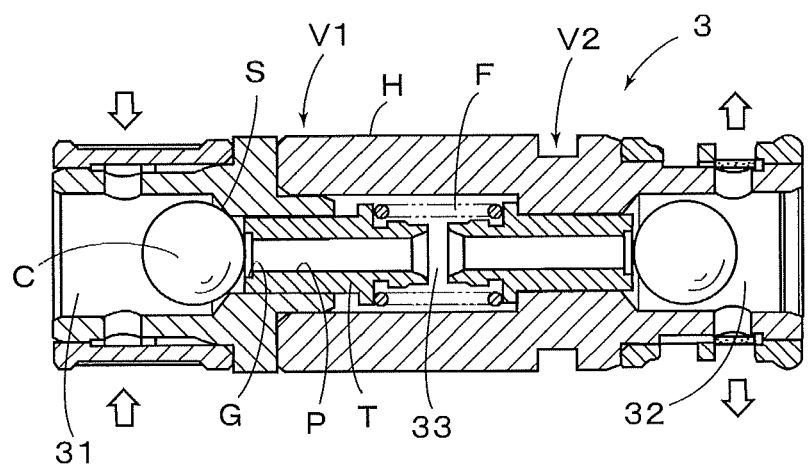
FIG. 3 is an enlarged sectional view showing an operating state of a valve mechanism for use in an embodiment of the present invention.

Accordingly, in each of the first and second throttle valve members V1 and V2 as shown in FIG. 2, normally, the spherical valve body C is unseated from the valve seat S, so that the first valve chamber 31, second valve chamber 32 and third valve chamber 33 are communicated with one another through the hollow portion P of the hollow member T. In contrast, as indicated by a white arrow in FIG. 3, in the case where the pressure difference, which is caused between fore and back of the hollow portion P (throttle), when the fluid moves from the first valve chamber 31 to the second valve chamber 32 through the third valve chamber 33, becomes equal to or greater than the predetermined biasing force (predetermined value Pc) of the spring F, the spherical valve body C of the first throttle valve member V1 comes to be seated on the valve seat S.

Figure 4:
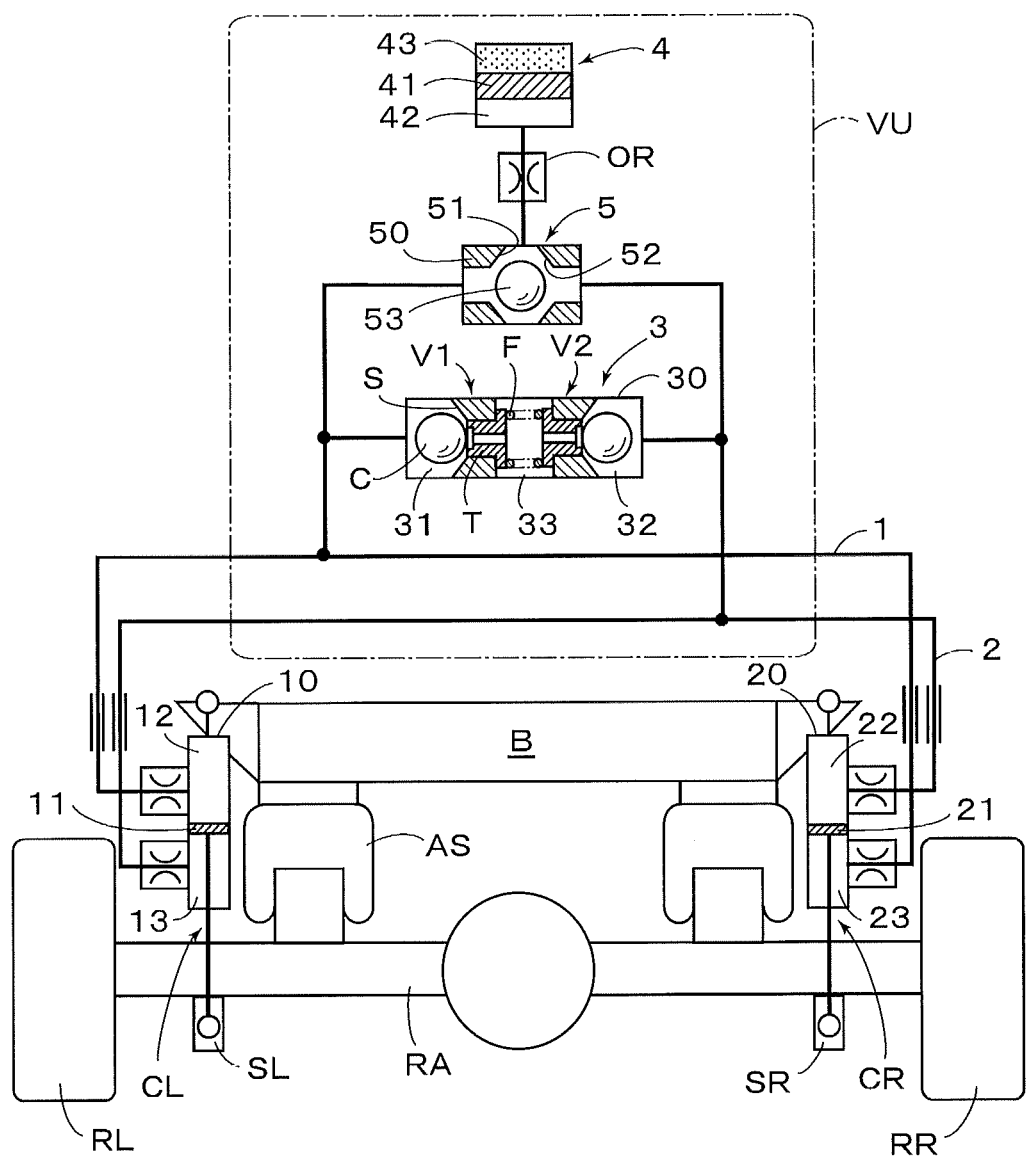
FIG. 4 is a front view showing schematically a structure at a rear axle of a suspension control apparatus according to another embodiment of the present invention.
Figure 5:
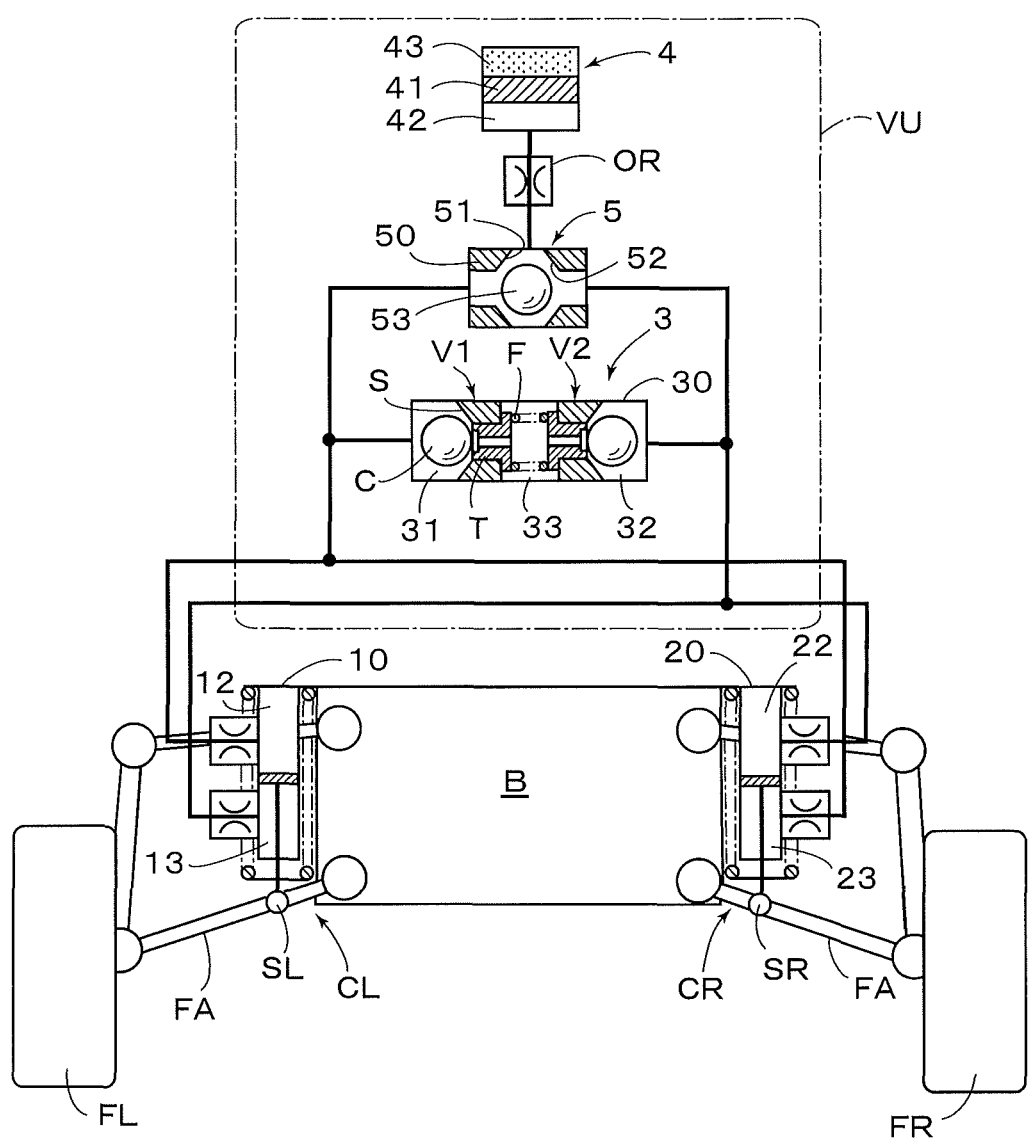
FIG. 5 is a front view showing schematically a structure at a front axle of a suspension control apparatus according to another embodiment of the present invention.

FIGS. 4 and 5 show the suspension control apparatus according to another embodiment of the present invention. FIG. 4 shows the structure at the rear axle RA of the vehicle, in the same manner as FIG. 1, whereas FIG. 5 shows the structure at the front axle FA of the vehicle. In FIG. 5, the left wheel cylinder CL and right wheel cylinder CR are mounted on the front axle FA of the vehicle, which is basically the same as the structure as shown in FIG. 4, so that its explanation is omitted herein, with the same reference numerals given to substantially the same members as shown in FIG. 4. Furthermore, in FIG. 5, the wheel at the front left side of the vehicle is indicated by "FL", and the wheel at the front right side of the vehicle is indicated by "FR".

According to the embodiment as shown in FIGS. 4 and 5, while only one accumulator 4 is provided, a changeover valve 5 is provided additionally. This changeover valve 5 is provided with a spherical valve body 53 accommodated in a housing 50, and so configured that the communication with one of valve seats 51 and 52 is blocked when the spherical valve body 53 is seated on either one of the valve seats 51 and 52. Accordingly, the changeover valve 5 is normally communicated, whereas when a pressure difference is caused between the pressure in the first communication passage 1 and the pressure in the second communication passage 2, the accumulator 4 is immediately changed over by the changeover valve 5 to communicate with the higher pressure one of the communication passages. As the remaining structure is substantially the same as the structure of the embodiment as shown in FIG. 1, its explanation is omitted herein, with the same reference numerals given to substantially the same members as shown in FIG. 1.

Accordingly, in the suspension control apparatus of the present embodiment, according to the apparatus as shown in FIG. 4, for example, as in the case where the vehicle is running straight on a flat road surface, when the left and right wheels RL and RR stroke in-phase, both of the changeover vale 5 and the valve mechanism 3 are placed in their open positions, so that the first valve chamber 31, second valve chamber 32 and third valve chamber 33 are communicated with one another, and therefore the accumulator 4, left wheel cylinder CL and right wheel cylinder CR are communicated with one another through the first communication passage 1 and second communication passage 2, so that the fluid can move freely, whereby a good ride comfort can be obtained.

For example, in the case where a rolling is caused by a turning motion of the vehicle, when one of the left and right wheels RL and RR strokes, so that a pressure difference is caused between the first communication passage 1 and the second communication passage 2, the higher pressure one of the first communication passage 1 and second communication passage 2 is communicated with the accumulator 4 by the changeover valve 5, and therefore the roll stiffness is applied by means of the accumulator 4, so that the rolling is restrained appropriately. Furthermore, in the case where a rapid rolling is caused, so that such a state of the pressure difference caused when the fluid moves from one of the first communication passage 1 and the second communication passage 2 to the other thereof being equal to or greater than the predetermined biasing force (predetermined value Pc) of the spring F lasts equal to or more than a predetermined time period, with the higher pressure one of the first communication passage 1 and second communication passage 2 being communicated with the accumulator 4 by the changeover valve 5, the fluid flow from the higher pressure one of the first communication passage 1 and the second communication passage 2 to the lower pressure one of them is blocked by the valve mechanism 3, whereby the rolling can be surely restrained. On the contrary, in the case where the speed of the fluid which moves from one of the first communication passage 1 and the second communication passage 2 to the other thereof is gradual, so that the pressure difference caused at that time is smaller than the predetermined biasing force (predetermined value Pc), then the valve mechanism 3 is held in its open position, so that the accumulator 4, left wheel cylinder CL and right wheel cylinder CR are maintained to be communicated with one another through the first communication passage 1 and the second communication passage 2, whereby a ride comfort can not be deteriorated. Also, in the case where the speed of the fluid moved from one of the first communication passage 1 and the second communication passage 2 to the other thereof is changed instantaneously, such as the case where only one wheel rides on a step when the vehicle is running on a rough road, the fluid flow is not blocked by the valve mechanism 3, so that the ride comfort is not deteriorated.

DESCRIPTION OF CHARACTERS

B: vehicle body
RA: rear axle

FA: front axle
CR: right wheel cylinder
CL: left wheel cylinder
SR, SL: wheel support portion
OR: Orifice
V1: first throttle valve member
V2: second throttle valve member
1: first communication passage
2: second communication passage
3: valve mechanism
4: accumulator
5: changeover valve
10: first housing
11: first piston
12,13: pressure chamber
20: second housing
21: second piston
22,23: pressure chamber

The invention claimed is:

1. A suspension control apparatus for a vehicle comprising:
a left wheel cylinder having a first piston with an end portion thereof being supported on a wheel support portion at a left side of at least one axle out of a front axle and a rear axle of the vehicle, and a first housing supported on a vehicle body and divided by the first piston to define a pressure chamber at an upper side of the vehicle and a pressure chamber at a lower side of the vehicle;
a right wheel cylinder having a second piston with an end portion thereof being supported on a wheel support portion at a right side of the at least one axle and a second housing supported on the vehicle body and divided by the second piston to define a pressure chamber at the upper side of the vehicle and a pressure chamber at the lower side of the vehicle;
a first communication passage coupled to the pressure chamber of the left wheel cylinder at the upper side of the vehicle and the pressure chamber of the right wheel cylinder at the lower side of the vehicle to be communicated with each other;
a second communication passage coupled to the pressure chamber of the left wheel cylinder at the lower side of the vehicle and the pressure chamber of the right wheel cylinder at the upper side of the vehicle to be communicated with each other; and
a valve mechanism disposed between the first communication passage and the second communication passage, the valve mechanism normally communicating the first communication passage with the second communication passage, and blocking fluid flow from one of the first communication passage and the second communication passage to the other thereof, in the case where a fluid filled in the first communication passage, the second communication passage, the left wheel cylinder and the right wheel cylinder causes a pressure difference to become equal to or greater than a predetermined value, when the fluid moves from one of the first communication passage and the second communication passage to the other thereof, wherein
the valve mechanism comprises a housing for defining a first valve chamber and a second valve chamber, and defining a third valve chamber communicated with both of the first and the second valve chambers, a first throttle valve member accommodated in the housing to open and close a communication passage between the third valve chamber and the first valve chamber, a second throttle valve member accommodated in the housing to open and close a communication passage between the third valve chamber and the second valve chamber, and a biasing portion which is accommodated in the housing, and which biases the first throttle valve member and the second throttle valve member so as to communicate the third valve chamber with the first valve chamber and the second valve chamber respectively,
the first communication passage is coupled to the first valve chamber to be communicated therewith, and the second communication passage is coupled to the second valve chamber to be communicated therewith, and wherein the first valve chamber, the second valve chamber and the third valve chamber are normally communicated with one another, and the fluid flow from one of the first valve chamber and the second valve chamber to the other thereof is blocked by one of the first throttle valve member and the second throttle valve member, in the case where the pressure difference, which is caused when the fluid moves from one of the first valve chamber and the second valve chamber to the other thereof through the third valve chamber, becomes equal to or greater than a predetermined biasing force of the biasing portion, and
the first throttle valve member and the second throttle valve member are accommodated in the first valve chamber and the second valve chamber respectively, and each of the first and the second throttle valve members comprises a spherical valve body disposed to block the communication between the first and the second valve chambers and the third valve chamber when seated on the respective valve seat provided in the housing, and a hollow member moving between two positions of one position for contacting the spherical valve body to force the spherical valve body to be unseated from the valve seat and the other position for forcing the spherical valve body to be seated on the valve seat, and the biasing portion comprises a spring for biasing each of the hollow members forming the first throttle valve member and the second throttle valve member so as to force the spherical valve body to be unseated from the valve seat, and wherein the spherical valve body is normally unseated from the valve seat so that the first valve chamber, the second valve chamber and the third valve chamber are communicated with one another through the hollow portions of the hollow members, and the spherical valve body is seated on the valve seat, in the case where the pressure difference, which is caused when the fluid moves from one of the first valve chamber and the second valve chamber to the other thereof through the third valve chamber, becomes equal to or greater than the predetermined biasing force of the spring.

2. A suspension control apparatus as claimed in claim 1, further comprising accumulators communicated with the first communication passage and the second communication passage respectively, to apply roll stiffness to the fluid filled in the left wheel cylinder and the right wheel cylinder respectively.

3. A suspension control apparatus as claimed in claim 1, further comprising a single accumulator communicated with the first communication passage and the second communication passage to apply roll stiffness to the fluid filled in at least one of the left wheel cylinder and the right wheel cylinder, and a changeover valve normally communicated with the accumulator, the first communication passage and the second communication passage, and changed over to communicate the accumulator with either one of the first communication passage and the second communication passage, when the pressure difference is caused between the pressure in the first communication passage and the pressure in the second communication passage.

4. A suspension control apparatus for a vehicle comprising:
a left wheel cylinder having a first piston with an end portion thereof being supported on a wheel support portion at a left side of at least one axle out of a front axle and a rear axle of the vehicle, and a first housing supported on a vehicle body and divided by the first piston to define a pressure chamber at an upper side of the vehicle and a pressure chamber at a lower side of the vehicle;
a right wheel cylinder having a second piston with an end portion thereof being supported on a wheel support portion at a right side of the at least one axle and a second housing supported on the vehicle body and divided by the second piston to define a pressure chamber at the upper side of the vehicle and a pressure chamber at the lower side of the vehicle;
a first communication passage coupled to the pressure chamber of the left wheel cylinder at the upper side of the vehicle and the pressure chamber of the right wheel cylinder at the lower side of the vehicle to be communicated with each other;
a second communication passage coupled to the pressure chamber of the left wheel cylinder at the lower side of the vehicle and the pressure chamber of the right wheel cylinder at the upper side of the vehicle to be communicated with each other; and
a valve mechanism disposed between the first communication passage and the second communication passage, the valve mechanism normally communicating the first communication passage with the second communication passage, and blocking fluid flow from one of the first communication passage and the second communication passage to the other thereof, in the case where a fluid filled in the first communication passage, the second communication passage, the left wheel cylinder and the right wheel cylinder causes a pressure difference to become equal to or greater than a predetermined value, when the fluid moves from one of the first communication passage and the second communication passage to the other thereof, wherein the valve mechanism comprises a housing for defining a first valve chamber and a second valve chamber, and defining a third valve chamber communicated with both of the first and the second valve chambers, a first throttle valve member accommodated in the housing to open and close a communication passage between the third valve chamber and the first valve chamber, a second throttle valve member accommodated in the housing to open and close a communication passage between the third valve chamber and the second valve chamber, and a biasing portion which is accommodated in the housing, and which biases the first throttle valve member and the second throttle valve member so as to communicate the third valve chamber with the first valve chamber and the second valve chamber respectively, the first communication passage is coupled to the first valve chamber to be communicated therewith, and the second communication passage is coupled to the second valve chamber to be communicated therewith, and wherein the first valve chamber, the second valve chamber and the third valve chamber are normally communicated with one another, and the fluid flow from one of the first valve chamber and the second valve chamber to the other thereof is blocked by one of the first throttle valve member and the second throttle valve member, in the case where the pressure difference, which is caused when the fluid moves from one of the first valve chamber and the second valve chamber to the other thereof through the third valve chamber, becomes equal to or greater than a predetermined biasing force of the biasing portion, and the suspension control apparatus further comprises a single accumulator communicated with the first communication passage and the second communication passage to apply roll stiffness to the fluid filled in at least one of the left wheel cylinder and the right wheel cylinder, and a changeover valve normally communicated with the accumulator, the first communication passage and the second communication passage, and changed over to communicate the accumulator with either one of the first communication passage and the second communication passage, when the pressure difference is caused between the pressure in the first communication passage and the pressure in the second communication passage.

* * * * *